May 3, 1932.     H. PÖSENTRUP     1,856,358
ADJUSTABLE FISH PLATES ENGAGING THE RAIL HEADS
Filed July 9, 1930
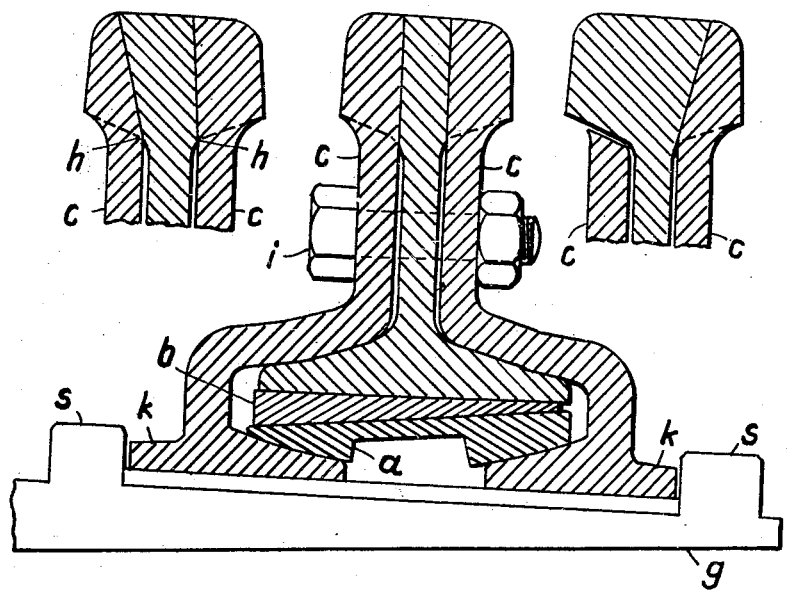
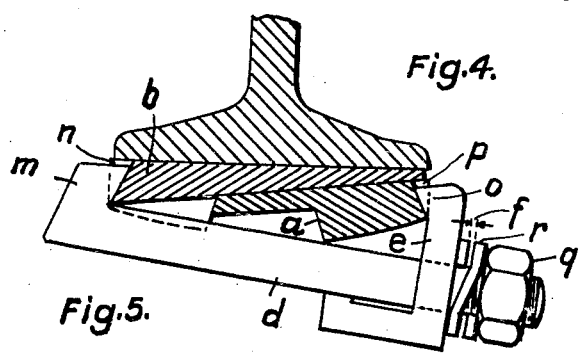
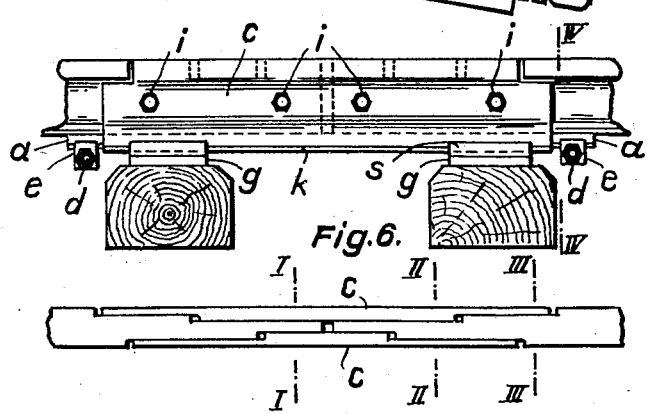
INVENTOR:

Patented May 3, 1932

1,856,358

UNITED STATES PATENT OFFICE

HEINRICH PÖSENTRUP, OF MUNSTER, GERMANY

ADJUSTABLE FISH PLATES ENGAGING THE RAIL HEADS

Application filed July 9, 1930, Serial No. 466,771, and in Germany July 19, 1929.

In the known practice of laying tracks the gaps between the long rails are too wide for a butt-joint. Consequently splice bar structures with hooked fish plates have been introduced for relieving the gaps between the rail ends.

This objection can, as is known, only be overcome by the fish-plates engaging the rail head. The one continuous gap is divided into a plurality of gaps in such a manner that any worm wheel obtains a sufficiently wide running surface over these part gaps. This engaging of the fish-plates in the rail head however obviates the wedge-shaped adjustable pressing in of the fish-plates between the rail-head and the rail base and consequently the rigid, non-bending connection of the rail ends. Hitherto this non-bending connection of the rail ends with fish-plates has not been superseded by a sufficiently effective and adjustable construction.

The known hooked fish-plates can however not be rolled to their final form. The final opening of the hooks must be effected by hot pressing. The bolts, which press the fish plates in, must be tightened only moderately, in order that the pressure exerted on the bases of rails does not become so strong, that the expanding of the rail is seriously impeded. There is no means of ascertaining the intensity of the pressure which is exerted. The stud bolts which are used loosen easily.

This invention has for its object the more advantageous construction of the hooked connection. An embodiment of the invention is illustrated by way of example in the accompanying drawings, in which:—

Fig. 1 shows the fish-plate connection in cross section.

Figs. 2 and 3 are part cross-sections which illustrate, together with Fig. 1, the engaging of the head of the fish-plate in the rail head.

Fig. 4 illustrates in a part cross section the screw connection for pressing together the plates.

Fig. 5 is a side elevation of the fish plate connection.

Fig. 6 is a top plan view of the running surface formed by the fish-plates and the rails.

The inner faces of the hooks were hitherto inclined in order to prevent the fish-plate from being pressed away from the rail by the tightening of the screws for pressing in the wedge plate, the manufacturing of the fish-plates by the rolling process being thereby rendered more difficult. The pressing away of the fish plate is avoided by the arrangement illustrated in Figs. 4 and 5. The bearing plate $a$ and the wedge plate $b$ are made slightly longer than the fish-plate $c$ and a screw bolt $d$ acts on the projecting ends of the bearing plate and wedge plate. The hook-shaped head $m$ of screw bolt $d$ bears against a correspondingly shaped recessed portion $n$ of the wedge plate $b$. An angle plate $e$ is shiftable on the shank of the bolt, the arm $o$ of the angle plate engaging like the hook-shaped head $m$ in a recess $p$ of plate $a$. A locking washer $r$ is situated between this arm $o$ and the nut $q$. The nut $q$ must be tightened only moderately so that the locking washer $r$ (Fig. 4) is not pressed quite flat by the nut $q$. The fish-plates $c$ can be easily constructed for fixing on the known tie-plates $g$ having ribs (Figs. 1 and 5). Each fish plate $c$ has an outwardly projecting lateral extension $k$. The ribs $s$ of the tie-plates $g$ prevent yielding of the fish-plates $c$ in lateral direction even when, as shown in Figs. 1 and 4, the bearing faces of the hooks for the bearing plate $a$, instead of ascending, are so inclined that the fish-plates $c$ are shaped so that they can be rolled without subsequent hot pressing. These bearing faces and also the corresponding bearing faces of the plate $a$ are preferably curved to a common radius in order that in the event of slight lateral displacement of the plates, which becomes necessary for compensating for irregularities of the construction, the uniform pressure of these faces is preserved. The heads of the fish-plates and rails are preferably milled so that the cut out portions starting from an edge $h$ engage with one another stepwise on the running surface. These steps are mutually displaced so that the running surface on each step is narrowed by the smallest possible amount. The gaps for expansion between the fish-plates and the rails are only half as wide as those of the rail joint proper Fig. 6. The fish-bolts are designated by *i* in Figs. 1 and 5.

I claim:—

1. A rail joint, comprising in combination with the fish-plates, bearing plates recessed at one end, wedge plates recessed at one projecting end, a bolt extending transversely under said bearing plate and said wedge plate projecting laterally from said fish-plate, a locking washer on said bolt, a hook-shaped head of said bolt engaging with the recess of said bearing plate, and an angle plate shiftable on said bolt one arm of said angle plate adapted to engage with the recess of said wedge plate.

2. A rail joint as specified in claim 1, in which the fish plate has an outwardly projecting lateral extension adapted to prevent lateral shifting.

3. A rail joint as specified in claim 1, in which the bearing faces of the hooks and of the bearing plates are curved according to a common radius.

In testimony whereof I affix my signature.

HEINRICH PÖSENTRUP.